(12) United States Patent
Kura et al.

(10) Patent No.: US 6,733,394 B2
(45) Date of Patent: May 11, 2004

(54) CONSTANT VELOCITY JOINT

(75) Inventors: Hisaaki Kura, Shizuoka-ken (JP); Tatsuro Sugiyama, Shizuoka-ken (JP); Masayuki Kuroda, Osaka-fu (JP)

(73) Assignee: NTN Corporation, Osaka-Fu (JP)

( * ) Notice: Subject to any disclaimer, the term of this patent is extended or adjusted under 35 U.S.C. 154(b) by 0 days.

(21) Appl. No.: 10/128,515

(22) Filed: Apr. 24, 2002

(65) Prior Publication Data

US 2002/0183121 A1 Dec. 5, 2002

(30) Foreign Application Priority Data

Apr. 25, 2001 (JP) ........................ 2001-128186

(51) Int. Cl.[7] ............................. F16D 3/205; F16C 33/60
(52) U.S. Cl. ...................... 464/111; 384/505; 464/905
(58) Field of Search .................... 464/111, 115, 464/120, 122, 123, 124, 132, 905; 384/499, 505, 506

(56) References Cited

U.S. PATENT DOCUMENTS

| 1,464,316 A | * | 8/1923 | Gillespie ................. 384/506 |
| 3,504,955 A | * | 4/1970 | Bailey .................... 384/535 |
| 3,748,869 A | * | 7/1973 | Orain ..................... 464/132 |
| 5,203,741 A |   | 4/1993 | Turner, Colin F. S. et al. |
| 5,213,546 A | * | 5/1993 | Schneider ................ 464/111 |
| 5,538,473 A |   | 7/1996 | Busch et al. |
| 5,935,009 A | * | 8/1999 | Hosdez et al. ............ 464/111 |
| 6,435,972 B1 | * | 8/2002 | Kita et al. .............. 464/111 |
| 6,454,655 B1 | * | 9/2002 | Kudo et al. .............. 464/111 |
| 6,533,668 B2 | * | 3/2003 | Mizukoshi et al. ......... 464/111 |

FOREIGN PATENT DOCUMENTS

| DE | 42 40 144 C1 | 2/1994 |
| EP | 10-220489 | 8/1998 |
| EP | 10-311344 | 11/1998 |
| EP | 1 008 777 A2 | 6/2000 |
| EP | 2000-227125 | 8/2000 |

* cited by examiner

Primary Examiner—Lynne H. Browne
Assistant Examiner—Kenn Thompson
(74) Attorney, Agent, or Firm—Arent Fox PLLC

(57) ABSTRACT

It is intended that the induced thrust and slide resistance of a constant velocity joint should be further reduced. To this end, there is provided a constant velocity joint comprising an outer joint member having three track grooves each having circumferentially opposed roller guide surfaces, a tripod member having three radially projecting leg shafts, a roller inserted in each track groove, and a ring fitted on each leg shaft to rotatably support the roller, the roller being movable along the roller guide surfaces axially of the outer joint member. The roller includes a set of annular roller segments, with a plurality of balls interposed between outer raceway surfaces formed on the inner periphery of the annular roller segments and a single inner raceway surface formed on the outer periphery of the ring.

18 Claims, 14 Drawing Sheets

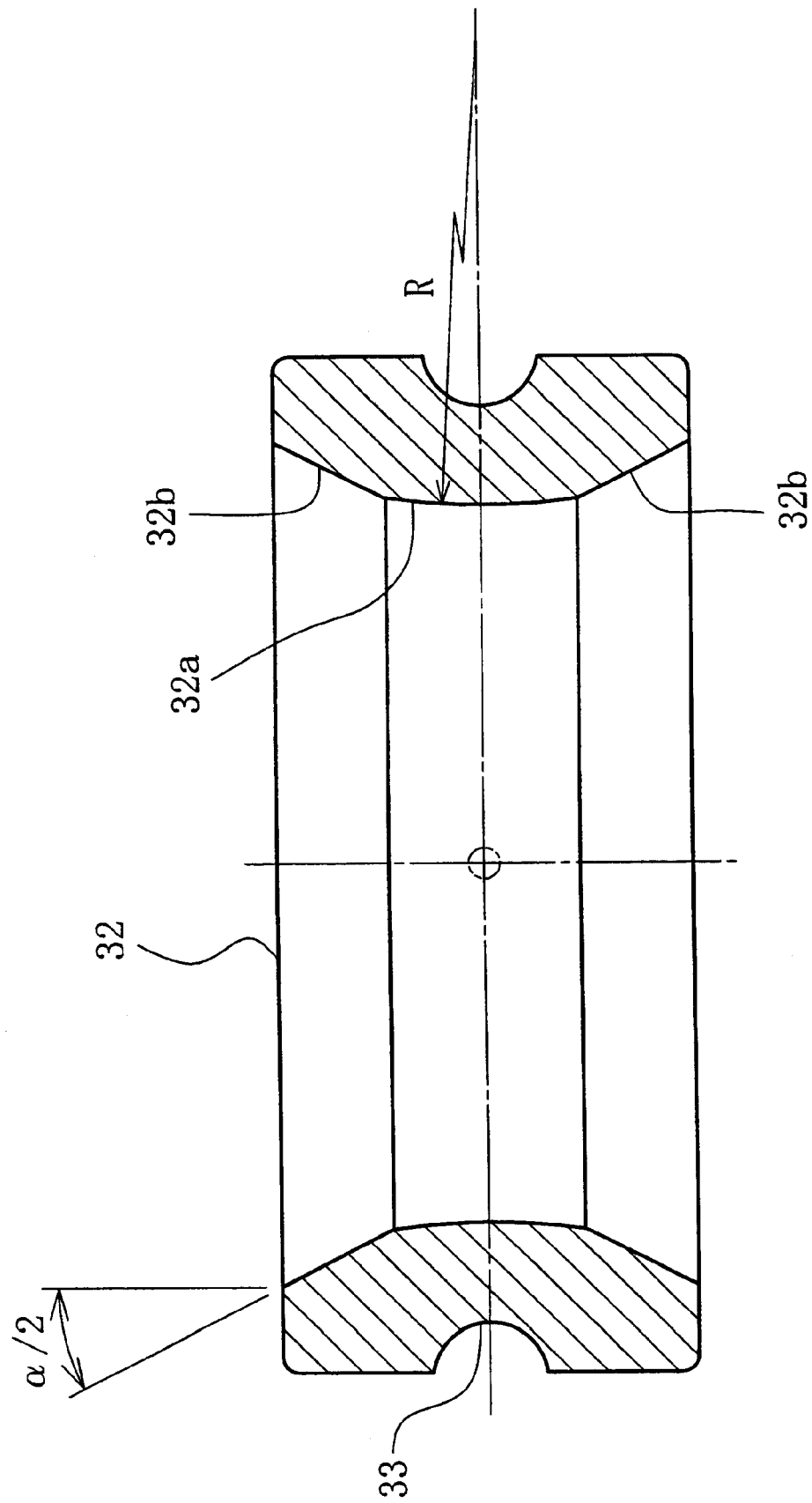

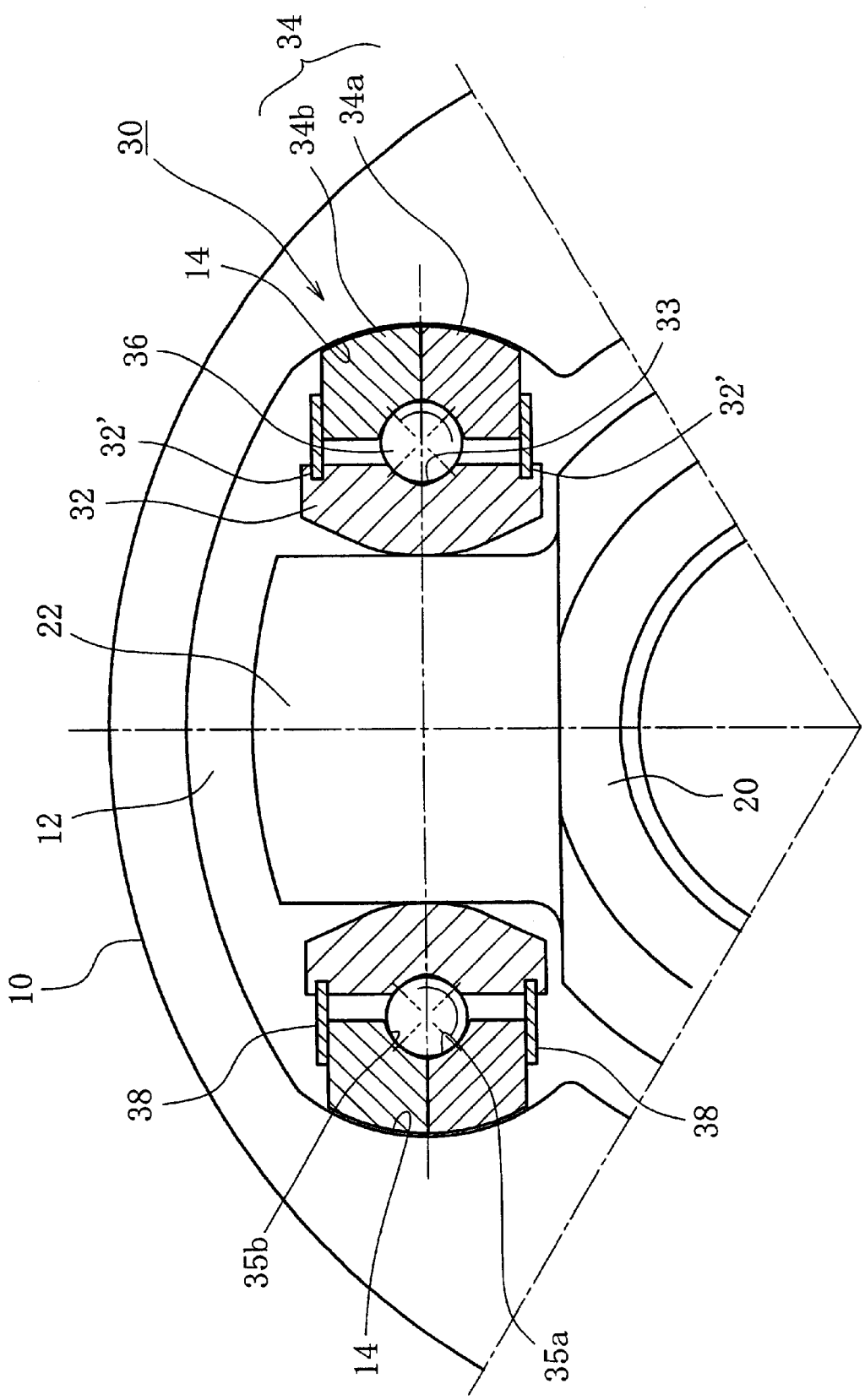

CONSTANT VELOCITY JOINT

BACKGROUND OF THE INVENTION

1. Field of the Invention

This invention relates to a constant velocity joint, particularly a slide type tripod type constant velocity joint.

2. Brief Description of the Prior Art

Generally, a constant velocity joint is a kind of universal joint adapted to join two shafts, driving side and driven side, and capable of transmitting torque at constant velocity even if there is an angle between said two shafts. The slide type allows a relative axial displacement between two shafts by the plunging of the joint, while the tripod type comprises a tripod member having three radially projecting leg shaft and joined to one shaft, and a hollow cylindrical outer joint member having three axially extending track grooves and joined to the other shaft, the leg shafts of the tripod member being received in the track grooves of the outer joint member to effect torque transmission.

An example of a slide type tripod type constant velocity joint will now be described with reference to FIG. 14. It comprises an outer joint member 1 having three axially extending track grooves 2 formed in the inner peripheral surface thereof, a tripod member 4 inserted in the outer joint member 1 and having three radially projecting leg shafts 5 having annular rollers 7 rotatably fitted on their columnar outer peripheral surfaces through a plurality of needle rollers 6, said rollers 7 being inserted in the track grooves 2. A pair of roller guide surfaces 3 opposed to each other in the circumferential direction of the track groove 2 are concave surface (partial cylindrical surfaces) parallel with the axis of the outer joint member 1, while the outer peripheral surfaces of the rollers 7 fitted on the three leg shafts 5 are convex surfaces (partial sphere surfaces) suited for the roller guide surfaces 3. Each roller 7 is engaged with the roller guide surfaces 3 of the corresponding track groove 2 and is capable of moving axially of the outer joint member 1 along the track groove 2 while rotating around the axis of the leg shaft 5.

As shown in FIG. 14(B), when torque is transmitted with the joint taking an operating angle θ, the roller 7 and the roller guide surface 3 are in a mutually crossing relationship, as shown in FIG. 14(C). In this case, whereas the roller 7 tends to make a rolling movement in the direction of arrow t shown in FIG. 14(B), the roller 7 moves while being restrained by the roller guide surface 3 because the roller guide surfaces 3 are partial cylindrical surfaces parallel with the axis of the outer joint member 1. As a result, sliding friction takes place between the roller guide surfaces 3 and the roller 7, producing a slide resistance. Further, this sliding friction produces induced thrust in the axial direction. Such slide resistance and induced thrust cause vibrations and noise in a car body, influencing the NVH (noise, vibration and harshness) of automobiles, decreasing the freedom of the design of the suspension; thus, it is desired to minimize said slide resistance and induced thrust.

As for a slide type tripod type constant velocity joint that is designed to decrease such slide resistance and induced thrust, for example, one having the construction shown in FIG. 15 is known. That is, as shown, the outer peripheral surface of the leg shaft 5 of the tripod member 4 is made a true spherical surface, and slidably fitted on this true spherical surface is the cylindrical inner peripheral surface of a cylindrical ring 8. The ring 8 and roller 7 constitute a roller assembly which is relatively rotatable through needle rollers 6. The needle rollers 6 are disposed in the so-called "all roller condition" between the cylindrical outer peripheral surface of the ring 8 and the cylindrical inner peripheral surface of the roller 7 and are prevented from slipping off by annular stop rings 9. The roller 7 is received in the track groove 2 in the outer joint member 1, and is capable of moving axially of the outer joint member 1 while rolling on the roller guide surfaces 3 of the track groove 2.

The outer peripheral surface of the leg shaft 5 is a true spherical surface having a center of curvature on the axis of the leg shaft 5, and the roller assembly (7, 8, 9) oscillates around said center of curvature. The roller assembly is oscillatable; therefore, when torque transmission is effected with the outer joint member 1 and the tripod member 4 taking an operating angle, the roller 7 is guided by roller guide surfaces 3 of the outer joint member 1 to keep a position parallel with the axis of the outer joint member 1, and keeping this position, it correctly rolls on the roller guide surfaces 3. Therefore, the sliding friction produced during torque transmission with the operating angle taken is reduced, suppressing the generation of slide resistance and induced thrust.

It is known to use a slide type tripod type constant velocity joint in order to transmit torque at constant velocity from an automobile engine to the wheels. The slide type tripod type constant velocity joint has barrel shaped rollers attached to the leg shafts of the tripod member and needle rollers are used as "cageless all roller type" to serve as rolling elements between the outer peripheral surface of the leg shaft and the inner peripheral surface of the barrel shaped roller. And, when torque is transmitted with an operating angle taken, induced thrust is produced by mutual friction between the inner parts during rotation, and slide resistance is produced even during stoppage if the joint is subjected to forceful axial expansion and contraction. The typical NVH phenomenon of automobiles in which such induced thrust and slide resistance take part includes the rolling of the car body during running, which is connected with the former, and a D-range idling vibration phenomenon in an AT car during stoppage, which is connected with the latter.

The key to solving the automobile NVH problem is to reducing the size of the induced thrust and slide resistance of the joint. Generally, the induced thrust and slide resistance of the joint tend to depend on the size of the operating angle. Therefore, applying the joint to the drive shaft of an automobile leads to a design restriction inhibiting the operating angle from being increased. Thus, in order to increase the freedom of the design of the suspension of automobiles, it has been a problem to reduce and stabilize the induced thrust and slide resistance.

However, since the rolling elements in the conventional slide type tripod type constant velocity joint are needle rollers of the all roller type, unbalanced loads, such as edge load, tend to act on the rolling element surfaces owing to the skewing or the like of the rollers during rotation. Further, the contact state does not become stabilized owing to factors associated with interior clearances and precision, resulting in the barrel shaped rollers being inclined to produce an edge load. Further, because of the construction, relative slip occurs between the ends of the barrel shaped roller, the leg shaft and the stop rings. Such phenomena as skew, edge load and relative slip are believed to govern the size of the frictional force in the joint.

SUMMARY OF THE INVENTION

Accordingly, an object of the present invention is to minimize the frictional force to further reduce the induced thrust and slide resistance and to improve stability.

An invention described in claim 1 is a constant velocity joint comprising an outer joint member having three track grooves each having circumferentially opposed roller guide surfaces, a tripod member having three radially projecting leg shafts, a roller inserted in each said track groove, and a ring fitted on each said leg shaft to rotatably support said roller, said roller being movable along said roller guide surfaces axially of the outer joint member, wherein said roller consists of a set of annular roller portions, the inner periphery of each said annular roller portion and the outer periphery of said ring being respectively formed with a raceway surface for a single row of balls to roll thereon, with balls interposed between the raceway surfaces.

The roller consisting of a set of annular roller portions includes not only a first type which consists of two annular roller portions but also a second type which consists of three annular roller portions and a third type having an intermediate body interposed between adjacent annular roller portions. Therefore, in the case of the roller consisting of two annular roller portions, the roller has an outer raceway surface over the two annular roller portions. In the case of the roller consisting of three annular roller portions, the roller has an outer raceway surface over the three annular roller portions or has outer raceway surfaces in the annular roller portions disposed on both sides.

Since the roller is of split construction consisting a set of annular roller portions, relative rotation of the annular roller portions is allowed, thus reducing slide resistance and rolling resistance. That is, when torque is transmitted with the outer joint member and the tripod member taking an operating angle, the roller swings while describing an arc with respect to the roller guide surfaces. At this time, since the position of contact between each annular roller portion and the roller guide surface are spaced axially of the leg shaft, the distance from the position of contact between each annular roller portion and the roller guide surface to the center of the tripod member differs, and the peripheral speeds of both annular roller portions differ from each other. As a result of the peripheral speeds differing from each other, an angular positional deviation of the annular roller portions can take place. However, since the annular roller portions are relatively rotatable, said angular positional deviation is accommodated by the relative rotation of the annular roller portions. Therefore, the slide resistance and rolling resistance associated with the roller arcuately swinging on the roller guide surfaces are reduced. Further, the split construction of the roller facilitates incorporation of balls and eliminates the need to provide an introducing groove.

Since the roller interposed between the tripod member and the outer joint member is supported by balls which always smoothly rotate with low friction without causing any trouble, such as skew, low friction low resistance rolling is realized when the roller rolls in the track groove in the outer joint member along the roller guide surfaces. Therefore, the slide resistance associated with the roller sliding in the track groove axially of the outer joint member, and the induced thrust produced when torque is transmitted with an operating angle formed between the outer joint member and the tripod member, are further reduced; thus, a high-performance slide type tripod type constant velocity joint with reduced noise and vibration can be provided.

Further, supporting the roller by balls ensures that as compared with the case of needle rollers, the load capacity for moment load increases and durability improves. Further, it is believed that it becomes easier for the annular roller portions to rotate synchronously.

The invention described in Claim 2 is a constant velocity joint as set forth in Claim 1, characterized in that said set of annular roller portions abut against each other axially of said leg shaft.

Thus, said set of annular roller portions abutting against each other axially of said leg shaft results in the set of annular roller portions moving as a unit axially of the joint on the roller guide surfaces. Of course, the relative rotation of the annular roller portions, which only abut against each other, is possible, as described above.

The invention described in Claim 3 is a constant velocity joint as set forth in Claim 1, characterized in that said set of annular roller portions has a clearance axially of said leg shaft.

Thus, said set of annular roller portions has a clearance axially of said leg shaft; therefore, even if a dimensional variation between the annular roller portions or between the annular roller portions and the roller guide surfaces of the outer joint member occurs within dimensional tolerance limits, good contact between the two can be secured to allow the roller assembly to move smoothly axially of the joint and on the roller guide surfaces. Further, the lubricating agent readily flows through the clearance between the set of annular roller portions, with the result that the lubricating performance between the roller and the roller guide surfaces is improved to reduce the friction resistance, suppressing heat generation, wear, flaking, adhesion, etc., thus improving the durability of the constant velocity joint.

The invention described in Claim 4 through 6 are a constant velocity joint as set forth in any of Claims 1 through 3, characterized in that the inner peripheral surface of said ring has a convexly arcuate section, and the outer peripheral surface of said leg shaft has a sectional shape such that it contacts the inner peripheral surface of said ring in a direction orthogonal to the axis of the joint and forms a clearance between itself and the inner peripheral surface of said ring in the axial direction of the joint. Concerning the cross sectional shape of the leg shaft, the wording "a sectional shape such that it contacts the inner peripheral surface of said ring in a direction orthogonal to the axis of the joint and forms a clearance between itself and the inner peripheral surface of said ring in the axial direction of the joint," in other words, means a shape such that the surface portions of the tripod member opposed to each other axially of the tripod member recede toward each other, i.e., from an imaginary cylindrical surface toward the smaller diameter side. A concrete example thereof is an elliptic shape (Claims 7 through 9). Herein, it is to be understood that "elliptic shape" is not limited literally to an ellipse and includes shapes called egg-shape, oval, etc.

Forming the cross sectional shape of the leg shaft as said shape allows the leg shaft to incline with respect to the outer joint member without changing the attitude of the roller assembly when the joint takes an operating angle. Furthermore, as is clear from a comparison between FIGS. 3 and 15(C), since the ellipse of contact between the outer peripheral surface of the leg shaft and the ring approaches a dot from an elongated form, the friction moment tending to incline the roller assembly is reduced. Therefore, the attitude of the roller assembly is stabilized all the time, and the roller is held parallel with the roller guide surfaces, so that the roller can roll smoothly. This contributes to reduction of the slide resistance and to reduction of induced thrust as well. Further, there is another advantage that the increased modulus of section of the root of the leg shaft increases the bending strength of the leg shaft. In addition, it is not necessary that the inner peripheral surface of the ring be cylindrical throughout the length; only the central portion contacting the leg shaft may be cylindrical, and both ends may be formed with flanks to avoid interference when the leg shat is inclined.

The roller assembly is interposed between the leg shaft and the outer joint member to perform the function of transmitting torque. Since the direction of transmission of torque in this type of constant velocity joint is always orthogonal to the axis of joint, transmission of torque is possible in that the leg shaft and the ring are in contact with each other in the direction of transmission of torque. Even if there is a clearance between the two in the axial direction of the joint, there is no possibility of causing trouble to torque transmission.

Furthermore, since the leg shaft is allowed to incline without inclining the ring, the roller is allowed to roll smoothly on the roller guide surfaces without being inclined. Therefore, a flange which is sometimes provided in the track groove in the outer joint member to inhibit the inclination of the roller may be omitted. Omission of such flange makes possible the reduction of weight of the outer joint member and the simplification of processing, and also eliminates the slide resistance due to the sliding contact between the roller and the flange, with the result that further reduction of slide resistance and induced thrust are achieved.

The invention is not limited to the embodiments described above in which the cross section of leg shaft is substantially elliptic. For example, it is applicable to the following arrangement. That is, the inventions described in Claims 10 through 12 are a constant velocity joint as set forth in any of Claims 1 through 3, characterized in that the inner peripheral surface of said ring is cylindrical and the outer peripheral surface of said leg shaft is spherical. The inventions described in Claims 13 through 15 are a constant velocity joint as set forth in any of Claims 1 through 3, characterized in that a bushing whose outer peripheral surface is convexly spherical and whose inner peripheral surface is cylindrical is interposed between the concavely spherical inner peripheral surface of said ring and the cylindrical outer peripheral surface of said leg shaft. The invention described in Claim 16 is a constant velocity joint as set forth in any of Claims 1 through 15, characterized in that the longitudinal section of the outer peripheral surface of said roller is convexly arcuate, and the cross section of said roller guide surfaces is concavely arcuate.

The invention described in Claim 17 is a constant velocity joint as set forth in any of Claims 1 through 15, characterized in that said balls and said raceway surface contact each other with a contact angle. Such arrangement increases the rigidity, serving to increase the load capacity and durability.

The invention described in Claim 18 is a constant velocity joint as set forth in any of Claims 1 through 15, characterized in that said roller and said roller guide surfaces make angular contact with each other. The roller and the roller guide surfaces make angular contact with each other, thereby making it difficult for the roller to swing, so that its attitude becomes further stable; therefore, when moving axially of the outer joint member, the roller smoothly rolls on the roller guide surfaces with less resistance. To give a concrete example of the arrangement to realize such angular contact, the generatrix of the outer peripheral surface of the roller may be convexly arcuate and the sectional shape of the roller guide surfaces may be taper or Gothic arch.

BRIEF DESCRIPTION OF THE DRAWINGS

FIG. 3 is an enlarged sectional view of a ring in the constant velocity joint of FIG. 1;

FIG. 4 is a principal sectional view of a constant velocity joint in an embodiment wherein a contact angle is formed between a roller and a ball and between the ball and a ring;

DESCRIPTION OF THE PREFERRED EMBODIMENTS

Figure 1A:
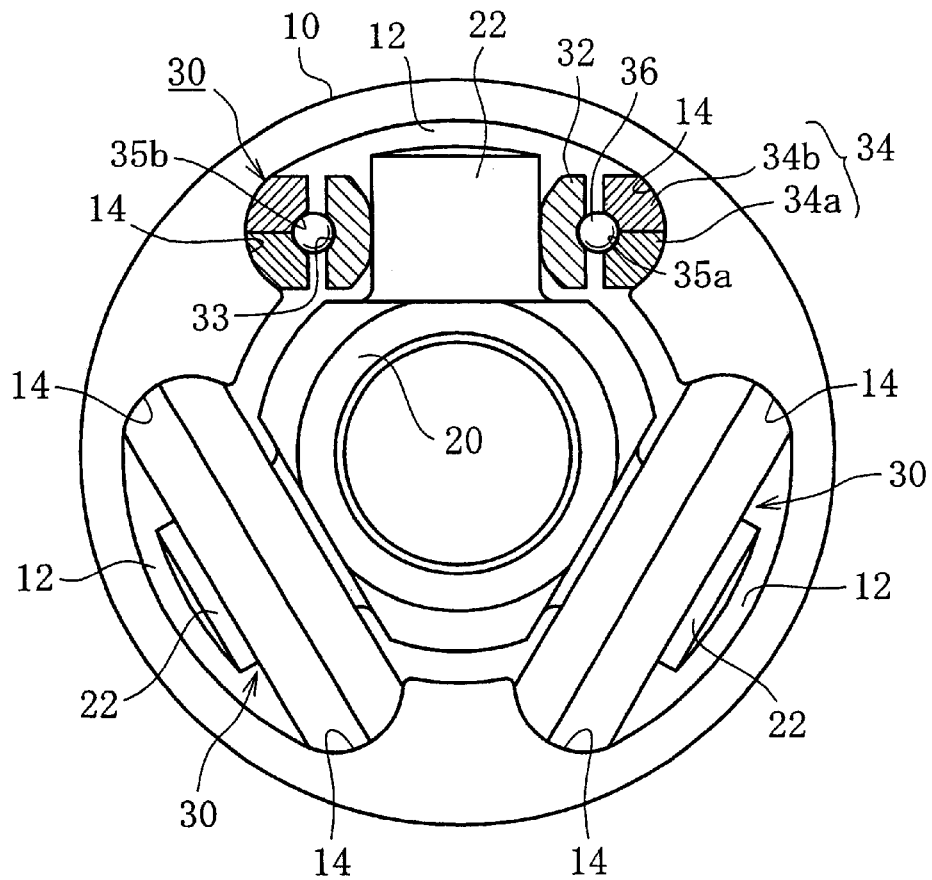
FIG. 1(A) is an end view, partly in section, of a constant velocity joint according to an embodiment of the invention; and (B) is a sectional view taken normal to a leg shaft of a tripod member.
Figure 1B:
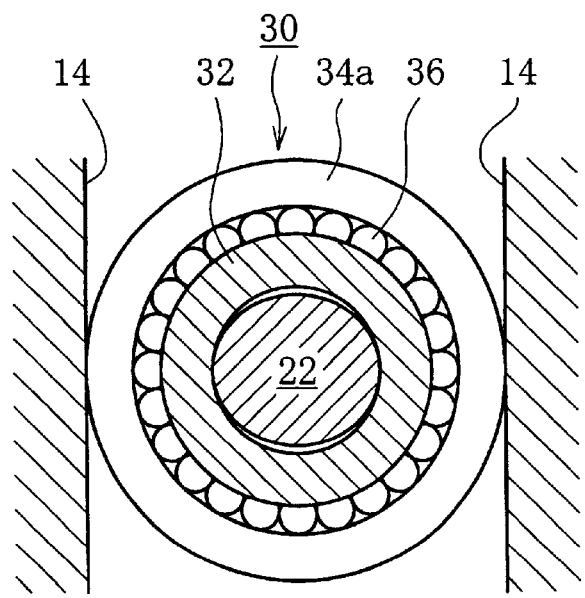
Figure 2A:
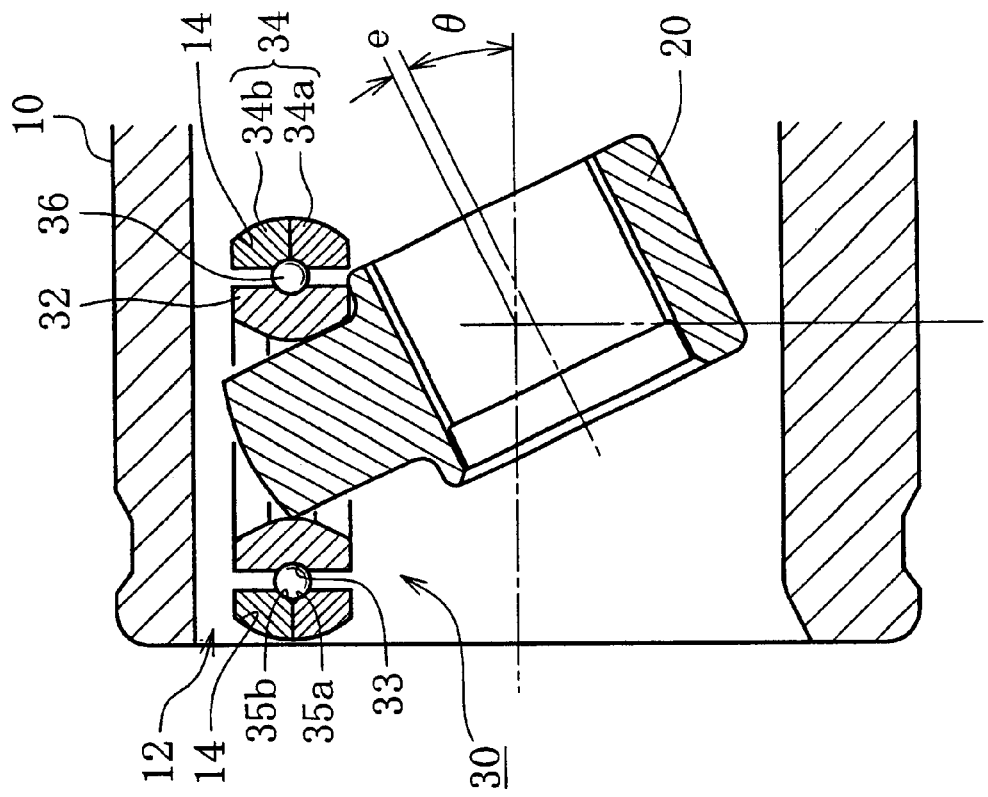
FIG. 2(A) is a longitudinal sectional view of the constant velocity joint in FIG. 1, showing an operating angle being taken; and (B) is a schematic side view of the tripod member in FIG. 2(A)

Embodiments of the invention shown in the drawings will now be described. FIG. 1(A) is an end view, partly in section, of a joint. FIG. 1(B) shows a section normal to a leg shaft including the mating surface of a roller portion. FIG. 2(A) shows the longitudinal section of the joint when the latter takes an operating angle θ. As shown, the constant velocity joint has an outer joint member 10 and a tripod member 20, and one of two shafts to be joined is connected to the outer joint member 1 and the other to the tripod member 20.

The outer joint member 10 is a bottomed cylinder, having three axially extending track grooves 12 in its inner periphery, as shown in FIG. 1(A) and FIG. 2(A). The circumferentially opposed side walls of each track groove 12 are formed with roller guide surfaces 14. The tripod member 20 has three radially projecting leg shafts 22, each leg shaft 22 carrying a roller assembly 30 (32, 34, 36). This roller assembly 30 is received in the track groove 12 of the outer joint member 10.

In this embodiment, the outer peripheral surface of the leg shaft 22, when seen in a cross sectional view (FIG. 1(B)), is elliptic, with the major axis orthogonal to the axis of the joint, and when seen in a longitudinal sectional view (FIG. 2(A)), it is straight and parallel with the axis of the leg shaft 22. In other words, the cross section is congruent at any axial position on the leg shaft 22. The elliptic shape of the leg shaft 22 is made substantially arcuate by reducing the thickness as seen axially of the tripod member 20. In other words, the cross sectional shape of the leg shaft 22 has its opposed surfaces, seen axially of the tripod member 20, displaced toward each other, that is, receding from an imaginary cylindrical surface toward the smaller diameter side.

The roller assembly 30 comprises a ring 32, a roller 34 and balls 36. The ring 32 fitted on the leg shaft 22, as shown in FIG. 3, is in the form of an annulus having an inner peripheral surface which is convexly arcuate in longitudinal section, with an inner raceway surface 33 formed on the outer periphery. And, the axially opposite sides in the inner peripheral surface 32a of the ring 32 are formed with flanks 32b. The roller 34 is, in this case, of split construction, composed of a pair of annular roller portions 34a, 34b contacting each other in a plane normal to the axis. The outer peripheral surface of each annular roller portion 34a, 34b is a part of a spherical surface with a center of curvature located at a point radially spaced from the axis, that is, a partial spherical surface. The annular roller portion 34a and 34b have outer raceway surfaces 35a and 35b, respectively, on the inner periphery, in the form of approximately ¼ concavely spherical surfaces. The ring 32 and roller 34 are unitized through a plurality of balls 36, constituting a relatively rotatable roller assembly 30. That is, balls 36 are rollably interposed between the inner raceway surface 33 on the outer periphery of the ring 32 and the outer raceway surfaces 35a and 35b of the inner periphery of the roller portions 34a and 34b. As shown in FIG. 1(B), the balls 36 are incorporated in the cageless, so-called all ball condition in which as many balls as possible are held. Because of the split construction of the roller 34, the balls 36 can be easily incorporated without requiring a special contrivance, such as an introducing groove.

The roller assembly 30 (32, 34, 36), carried on the leg shaft 22, is received in the track groove 12 of the outer joint member 10. Once received in the track groove 12, the roller assembly 30 cooperates with the roller guide surfaces 14 to hold the unit without letting it disassemble. However, it is desirable to arrange that the roller assembly 30 will not disassemble until it is received in the track groove 12 or when the roller assembly 30 is removed from the track groove 12 by disassembling the joint for maintenance, inspection or the like. To this end, as shown in FIG. 4, annular grooves 32' are formed in the outer peripheral surface of the ends of the ring 32 and stop rings 38 are fitted therein, thereby fixing the annular roller portions 34a and 34b in the direction of the width. This arrangement enables unit handling of the roller assembly 30 and facilitates handling.

The roller guide surfaces 14 of the outer joint member 10 contacting the outer peripheral surface of the roller 34 have a sectional shape which fits the outer peripheral surface of the roller 34. For example, the roller guide surface 14 may be constituted by a portion of a cylindrical surface whose axis is parallel with the axis of the outer joint member 10 and the sectional shape thereof may be an arc corresponding to the generatrix of the outer peripheral surface of the roller 34. Further, it is also possible to arrange that the roller guide surfaces 14 and the roller 34 make angular contact with each other as will be later described. Further, the contact between the raceway surfaces 35a, 35b of the inner periphery of the roller 34 (annular roller portions 34a and 34b) and the balls 36, and the contact between the balls 36 and the raceway surface 33 of the outer periphery of the ring 32 may be given a contact angle to be later described.

FIG. 4 shows the principal enlarged sections of the contact portion between the roller guide surface 14 and the roller 34, the contact portion between roller 34 and the raceway surface for the balls 36, and the contact portion between the ball 36 and the raceway surface 33 of the ring 32. The contact between the roller guide surface 14 of concavely cylindrical sectional shape and the outer periphery of the roller 34 (annular roller portions 34a and 34b) of convexly arcuate sectional shape is surface contact. In contrast thereto, the radii of curvature of the raceway surfaces 35a and 35b of the inner periphery of the roller 34 (annular roller portions 34a and 34b) are set larger than the radius of the balls 36, and the raceway surfaces 35a and 35b and balls 36 contact each other at an angle of contact. Further, the radius of curvature of the raceway surface 33 of the ring 32 is formed using a composite curve larger than the radius of the balls 36, and the balls 36 and the raceway surface 33 of the ring 32 contact each other at a contact angle. Such arrangement increases rigidity; thus, it is useful for increasing the load capacity and durability.

Figure 5:
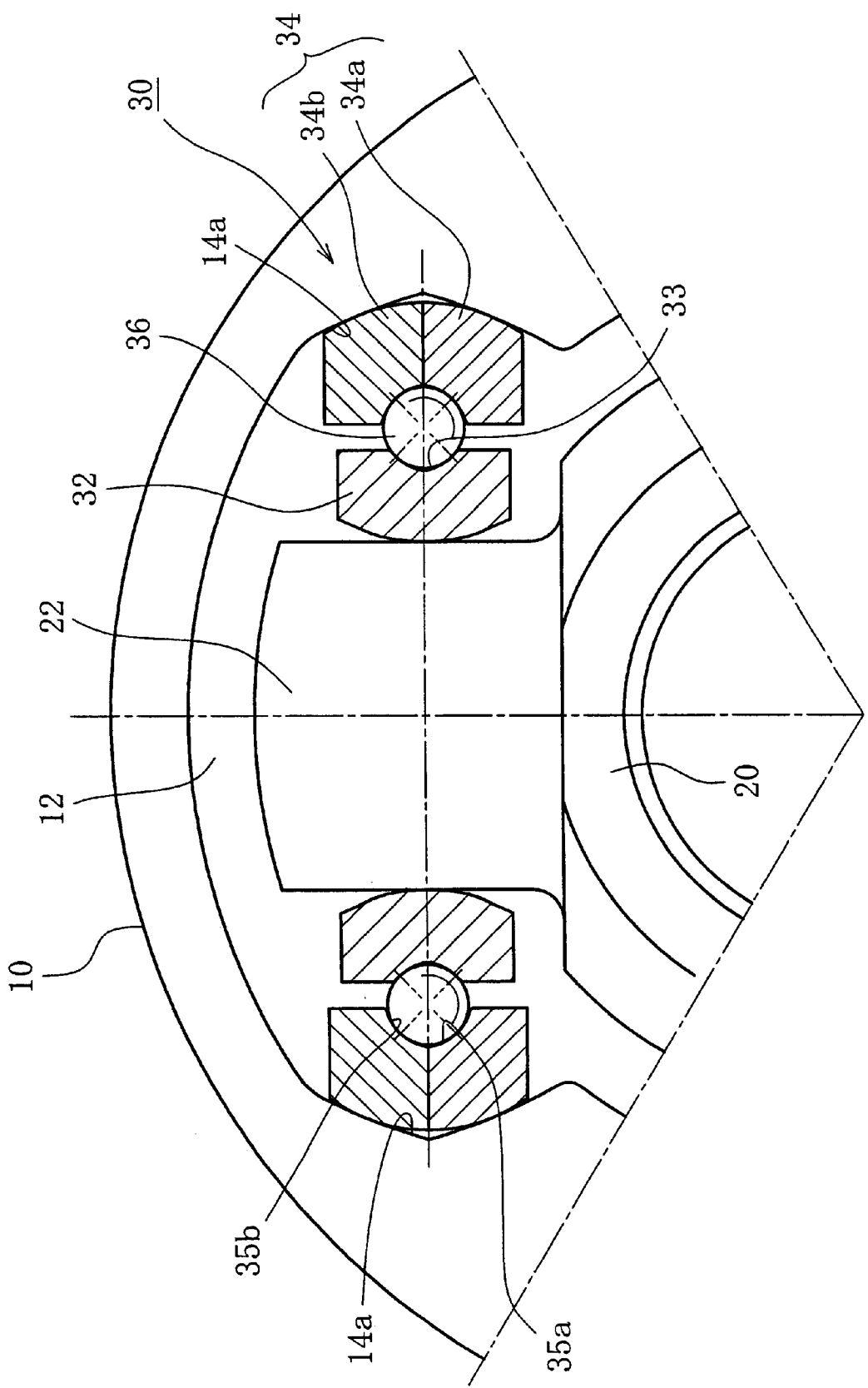
FIG. 5 is a principal sectional view of a constant velocity joint showing another embodiment wherein a roller and a roller guide surface make angular contact with each other.
Figure 6:
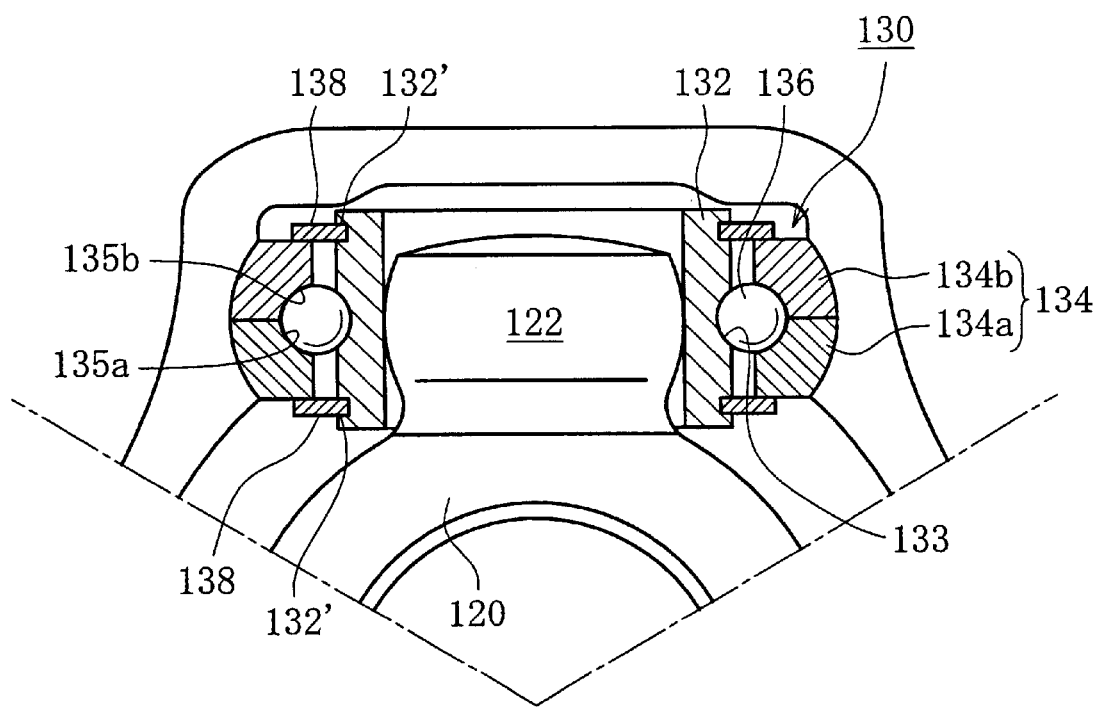
FIG. 6 is a principal sectional view of a constant velocity joint showing another embodiment.

Further, FIG. 5 is a principal enlarged sectional view showing an example in which the roller guide surface 14 and the roller 34 make angular contact with each other; whereas the roller guide surface 14a is of Gothic arch sectional shape, the outer peripheral surface of the roller 34 (annular roller portion 34a and 34b) is of convexly arcuate sectional shape. Such arrangement brings about a situation in which the roller guide surface 14 and the outer peripheral surface of the roller 34 (annular roller portions 34a and 34b) make angular contact so as to make it difficult for the roller 34 to swing, so that its attitude becomes stable; therefore, when moving axially of the outer joint member 10, the roller 34 smoothly rolls on the roller guide surfaces 14 with less resistance. In addition, though not shown, even if the sectional shape of the roller guide surfaces 14 is tapered, it may be arranged that the roller guide surfaces 14 and the outer peripheral surface of the roller 34 (annular roller portions 34a and 34b) make angular contact with each other.

In the case where the distance between the point of contact between the balls 36 and the annular roller portions 34a, 34b is longer than the distance between the points of contact between the roller portions 34a, 34b and the roller guide surface 14, transmission of torque between the outer joint member 10 and the leg shafts 22 results in the annular roller portion 34a appearing in the lower region in FIG. 1(A) being subjected to the action of counterclockwise moment load and the annular roller portion 34b appearing in the upper region being subjected to the action of clockwise moment load, so that they thrust each other. On the other hand, in the case where the distance between the point of contact between the balls 36 and the annular roller portions 34a, 34b is shorter than the distance between the points of contact between the annular roller portions 34a, 34b and the roller guide surface 14, transmission of torque between the outer joint member 10 and the leg shafts 22 results in the annular roller portion 34a appearing in the lower region in FIG. 1(A) being subjected to the action of clockwise moment load and the annular roller portion 34b appearing in the upper region being subjected to the action of counterclockwise moment load, so that they thrust each other. In either case, the annular roller portions 34a and 34b thrust each other, thus advantageously acting in maintaining the integrality of the roller assembly 30.

As shown in FIG. 3, the inner peripheral surface of the ring 32 has an arcuate convex section. That is, the generatrix of the inner peripheral surface is a convex arc, having a radius R. This, coupled with the fact that the longitudinal sectional shape of the leg shafts 22 is substantially elliptic, as described above, and that there is a predetermined clearance between the leg shafts 22 and the ring 32, allows the ring 32 not only to move axially of the leg shaft 22 but also to oscillate with respect to the leg shaft 22. Further, since the ring 32 and roller 34 are relatively rotatably unitized through the balls 36, as described above, the ring 32 and roller 34 are, as a unit, in oscillatable relationship to the leg shaft 22. The term "oscillate" used herein refers to the inclination of the axes of the ring 32 and roller 34 with respect to the axis of the leg shaft 22, in a plane including the axis of the leg shaft 22 (see FIG. 2(A)).

The inner peripheral surface of the ring 32 may also be made convexly arcuate substantially throughout the length. In this case, the generatrix of the inner peripheral surface of the ring 32 is defined by a combination of the central arcuate portion 32a and the flanks 32b on both sides thereof. The flanks 32b, as shown in FIG. 2(A), are portions for avoiding interference with the leg shaft 22 when the latter takes an operating angle θ, and they are defined by a straight line or curve which is gradually diametrically increased from the end of the arcuate portion 32a toward the end of the ring 32. Illustrated herein is the case where the flank 32b is a portion of a conical surface with an conical angle α of 50°.

Figure 2B:
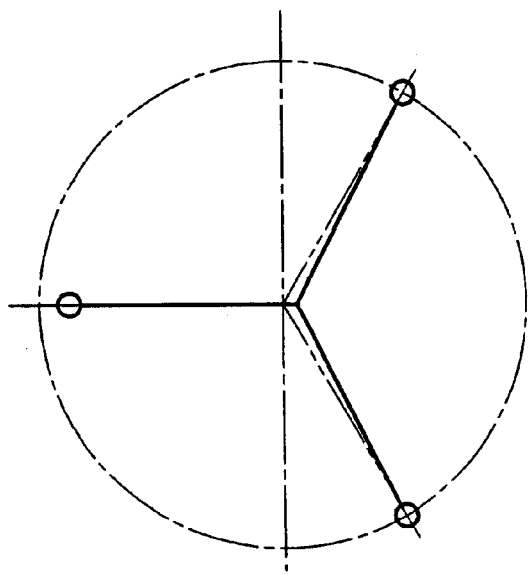

In a tripod type constant velocity joint, mechanically, for each revolution of the outer joint member 10, the tripod member 20 whirls three times with respect to the center of the outer joint member 10. The amount of eccentricity denoted by the character e (FIG. 2(A)) increases in proportion to the operating angle θ. And, although the three leg shafts 22 are spaced 120° apart from each other, taking the operating angle θ brings about a situation in which as shown in FIG. 2(B), when considered on the basis of the vertical leg shaft 22 which appears in the upper region in said figure, the other two leg shafts 22 are slightly inclined from their axes when the operating angle shown in two-dot chain line is zero. This inclination is about 2–3° when the operating angle θ is about 23°, for example. Since this inclination is rationally permitted by the curvature of the inner peripheral surface of the ring 32, the surface pressure in the region of contact between the leg shaft 22 and the ring 32 can be prevented from becoming excessively high. In addition, FIG. 2(B) schematically shows the three leg shafts 22 of the tripod member 20 as seen from the left-hand side of FIG. 2(A), the solid lines indicating the leg shafts.

Figure 15A:
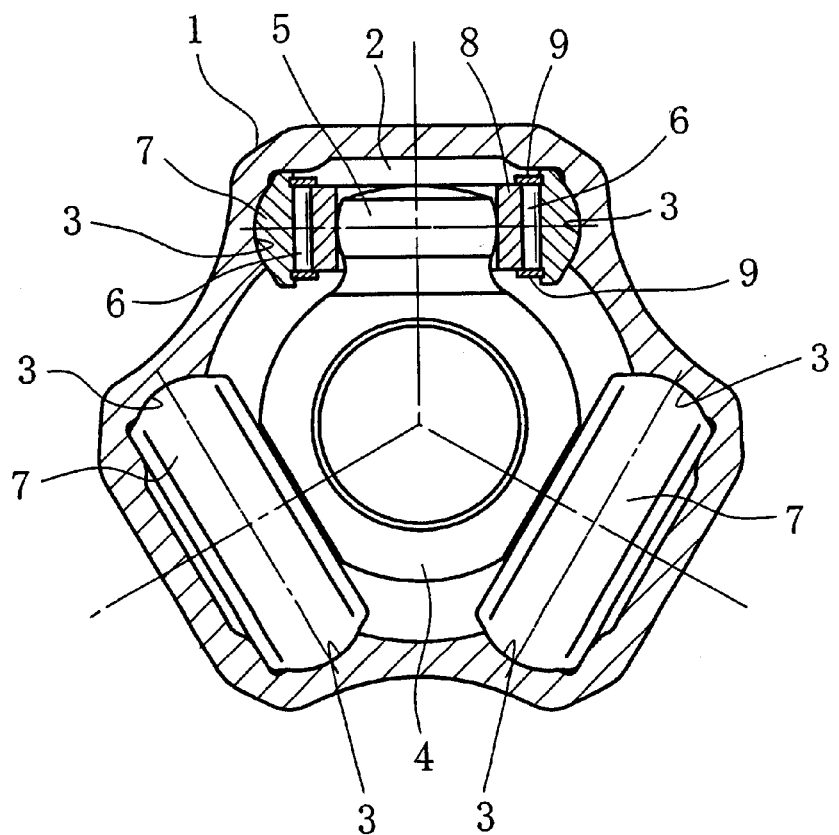
FIG. 15(A) is a cross sectional view of another conventional constant velocity joint; (B) is a sectional view taken normal to a leg shaft of a tripod member; and (C) is a sectional view of a ring for explaining a contact ellipse.
Figure 15B:
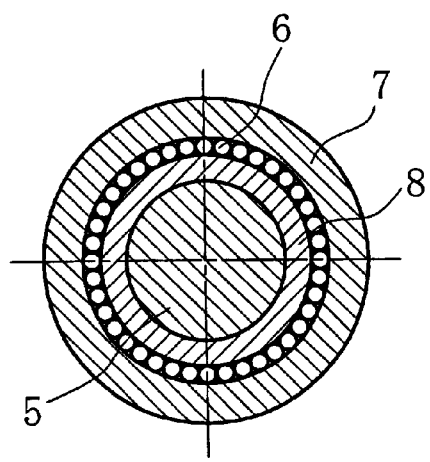
Figure 15C:
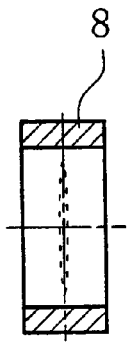

In the case of the conventional joint shown in FIG. 15, since the outer peripheral surface of the leg shaft 5 contacts the inner peripheral surface of the ring 8 over the entire periphery, the contact ellipse shows a transversely elongated shape extending circumferentially, as shown in broken line in FIG. 15(C). Therefore, when the leg shaft 5 is inclined with respect to the outer joint member 1, the movement of the leg shaft 5 is accompanied by a friction moment which acts to incline the ring 8 and the roller 7 as well. In contrast thereto, in the embodiment shown in FIG. 1, since the cross section of the leg shaft 22 is elliptic and the inner peripheral surface of the ring 32 is cylindrical, their contact ellipse resembles a dot as shown in two-dot chain line in FIG. 3 and has a small area. Therefore, when torque is transmitted with an operating angle taken, the force tending to incline the roller assembly 30 (32, 34, 36) is very low as compared with the prior art, and the stability of the attitude of the roller 34 is further improved.

Further, in the conventional joint shown in FIG. 15, in order to control the inclination of the roller 7, the innermost side of the track groove 2, that is, the larger diameter side as seen from the cross section of the outer joint member 1 is formed with a flange opposed to the end surface of the roller 7. However, in each embodiment described above, and in the embodiment to be described below, and in embodiments to be later described, the factor which causes the roller 34 to incline is reduced, so that it is not absolutely necessary to provide such flange; such flange may be omitted. As a result, even if the roller 34 temporarily deviates for one reason or another, there is no fear of the roller 34 contacting such flange to produce sliding friction.

In carrying out the embodiment shown in FIG. 1, torque is transmitted in that the leg shafts 22 of elliptic cross section and the annular ring 32 contact each other, as shown in FIG. 1(B); therefore, it is necessary that the surface pressure in the region of contact between the two be eased. Concrete embodiments therefor will now be described. In addition, in FIGS. 9(B) through 12, the vertical direction of the paper is the direction of torque transmission, i.e., associated with the loaded side, and the left-right direction of the paper is associated with the non-loaded side.

Figure 9A:
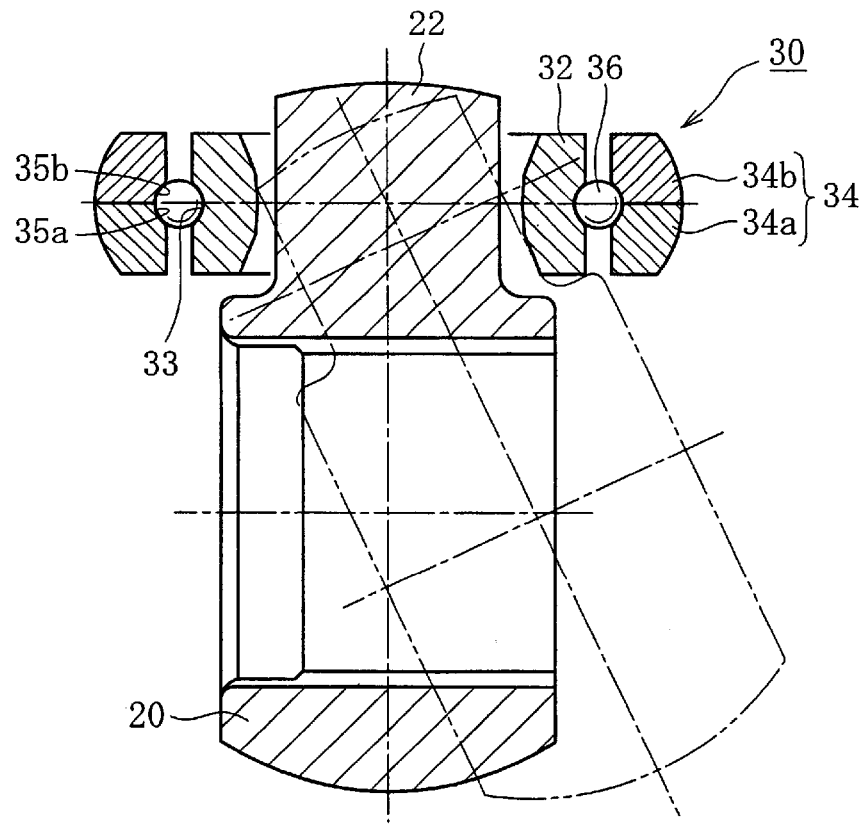
FIG. 9(A) is a sectional view of a roller assembly and a tripod member; and (B) is a plan view of the roller assembly in FIG. 9(A)
Figure 9B:
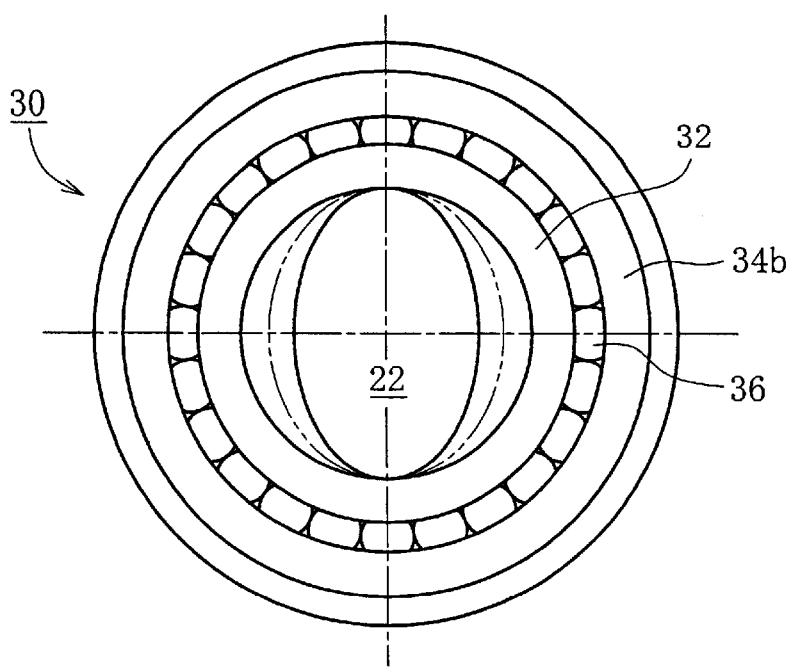

When torque is transmitted with the joint taking an operating angle θ, as shown in FIGS. 2(A) and 9(A), the leg shafts 22 make swing movement both ways with respect to the ring 32 within the range of operating angle θ. At this time, since there is a relatively large clearance between the leg shafts 22 and the ring 32 on the non-loaded side, the leg shafts 22 can swing without interfering with the ring 32. In the loaded side, however, as the inclination of the leg shafts 22 increases with increasing operating angle θ, the apparent curvature of the leg shafts 22 increases as shown in two-dot chain line in FIG. 9(B), until it is larger than the inner diameter of the ring 32, whereupon the leg shaft 22 and the ring 32 contact at two points. Then, the leg shafts 22 alone cannot freely incline, causing the ring 32 and the roller assembly 30 (32, 34, 36) as well to incline. Therefore, the cross sectional shape of the leg shafts 22, particularly the shape on the loaded side is determined such that the leg shafts 22 alone can incline within a predetermined angular range without interfering with the ring 32.

Figure 10:
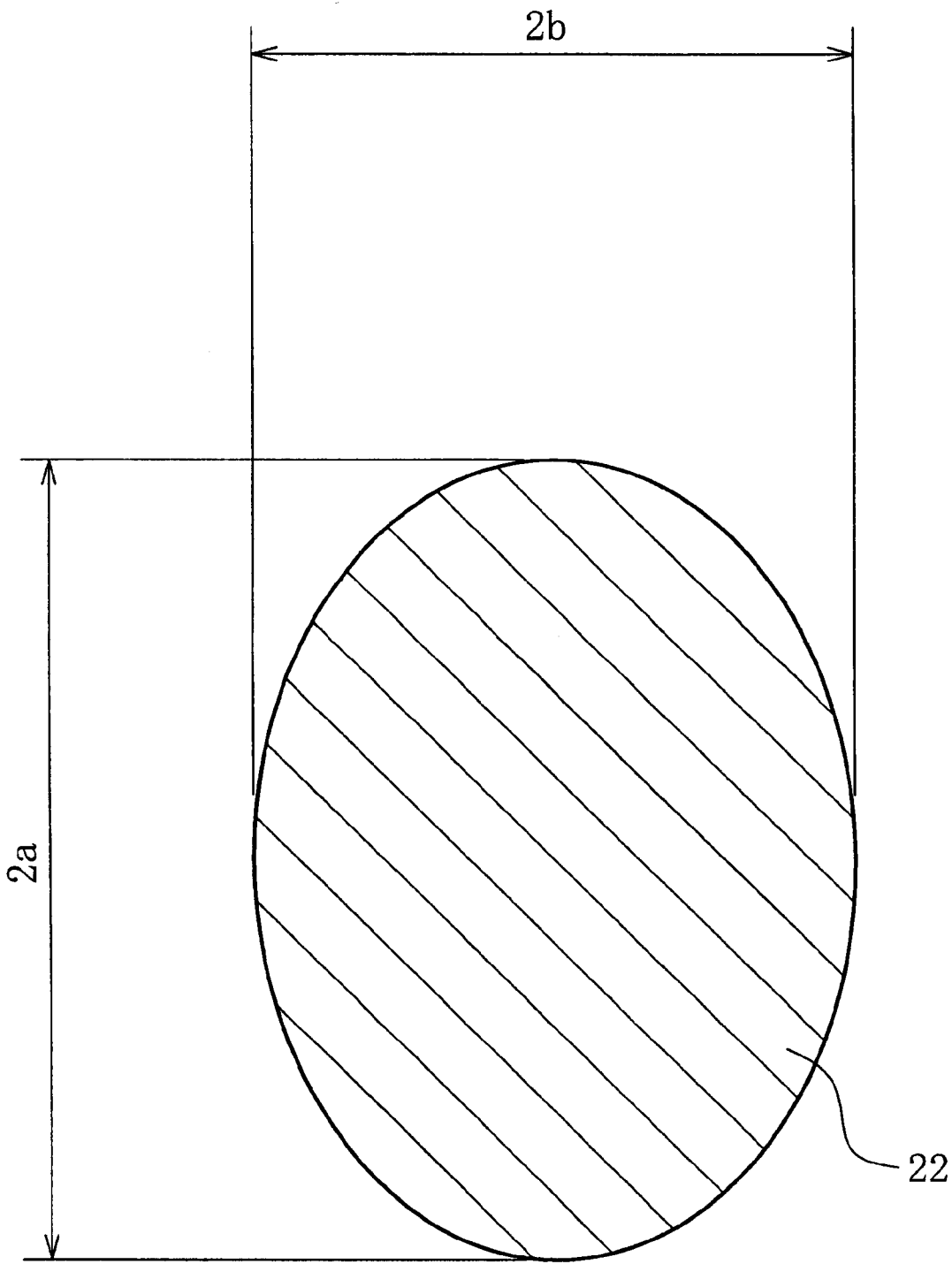
FIG. 10 is a cross sectional view of a leg shaft in the tripod member for explaining a embodiment corresponding to a case where the constant velocity joint takes an operating angle.
Figure 11:
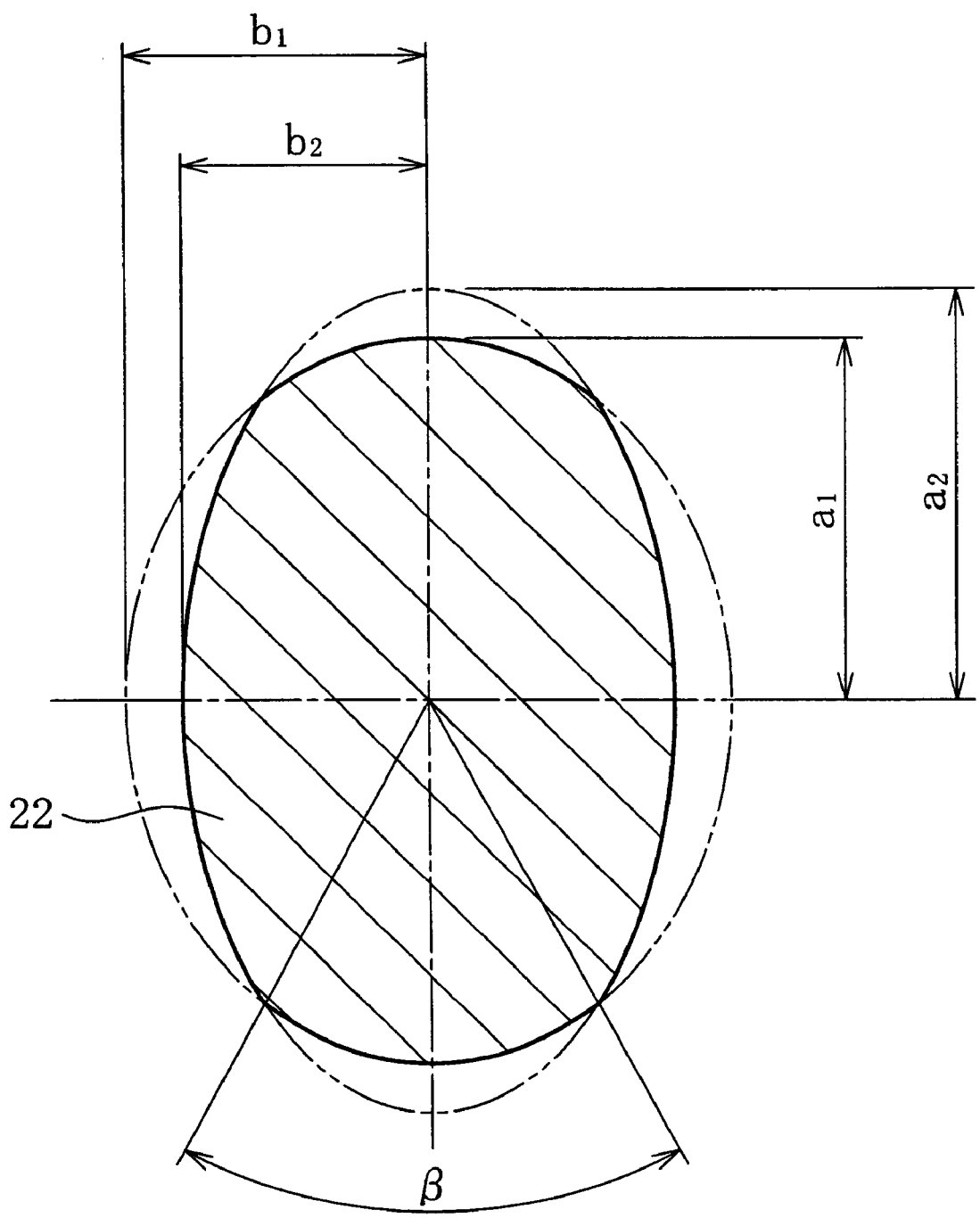
FIG. 11 is a cross sectional view of a leg shaft in the tripod member for explaining another embodiment corresponding to a case where the constant velocity joint takes an operating angle.

Concretely, when the maximum operating angle θ max is taken to be 25°, as shown in FIG. 10, the major radius a and minor radius b of the elliptic cross section of the leg shafts 22 and the radius of curvature, R (see FIG. 3), of the inner peripheral surface of the ring 32 are set as follows, whereby the ring 32 is prevented from inclining even if the joint takes the maximum operating angle θ max and the ellipse of contact between the leg shaft 22 and the ring 32 can be brought into close proximity to a circle (a minimum elliptic circle) when the operating angle is zero.

b/a=0.841.

R=1.369 a.

If the recommendable range of the radius of curvature, R, is 0.5 R–1.5 R, i.e., 0.684a–2.053a, then the ellipticity b/a is 0.836–0.647.

However, the above setting, though possible in terms of shape, can result in the surface pressure between the leg shafts 22 and the ring 32 being too high in terms of practical use of the automobile. If low vibration is to be found in the service operating angle area for automobile use, this can be attained by reducing the operating angle θ to the extent that the roller assembly 30 (32, 34, 36) does not incline, whereby the surface pressure reduces to allow practical use. For example, if the service operating angle θ is set at a value exceeding 10° but less than 20°, then the optimum values and recommendable ranges of the radius of curvature, R, of the inner peripheral surface of the ring, the ellipticity b/a are as shown in Table 1.

TABLE 1

|     | Operating Angle θ (°) | Optimum Value (Surface Pressure at Minimum) | Recommendable Range | |
| --- | --- | --- | --- | --- |
|     |     |     | 0.5 R | 1.5 R |
| R   | 20  | 1.994a | 0.997a | 2.992a |
|     | 15  | 2.898a | 1.449a | 4.347a |
|     | 10  | 4.731a | 2.365a | 7.096a |
| b/a | 20  | 0.806 | 0.875 | 0.730 |
|     | 15  | 0.859 | 0.914 | 0.801 |
|     | 10  | 0.909 | 0.948 | 0.869 |

As already described, the smaller the ellipticity b/a of the elliptic cross section of the leg shaft 22, the greater the ease with which the leg shaft 22 can be inclined without inclining the roller assembly 30 (32, 34, 36) even if a larger operating angle θ is taken. On the other hand, the surface pressure in the contact region rises and the strength of the leg shafts 22 lowers. Accordingly, in an embodiment shown in FIG. 11, the cross sectional shape of the leg shafts 22 is a composite elliptic shape having an ellipticity $b_1/a_1$ which is increased only in the region for contact with the ring 32, that is, the contact region β, and an ellipticity $b_2/a_2$ which, in the other non-contact region (180°−β), has a value such that it will not cause interference at the maximum operating angle θ max. For example, in the case where the service operating angle θ is 15° and the radius of curvature, R, of the inner peripheral surface of the ring 32 is 2.898a, the ellipticity $b_1/a_1$ for the contact region is 0.859 and the ellipticity $b_2/a_2$ of the non-contact region is 0.635. In addition, in FIG. 11, although the contact region β is shown in only the lower side of the figure, since the cross section of the leg shaft 22 is symmetrical, it goes without saying that the contact region exist also in the upper side of the figure.

Figure 12:
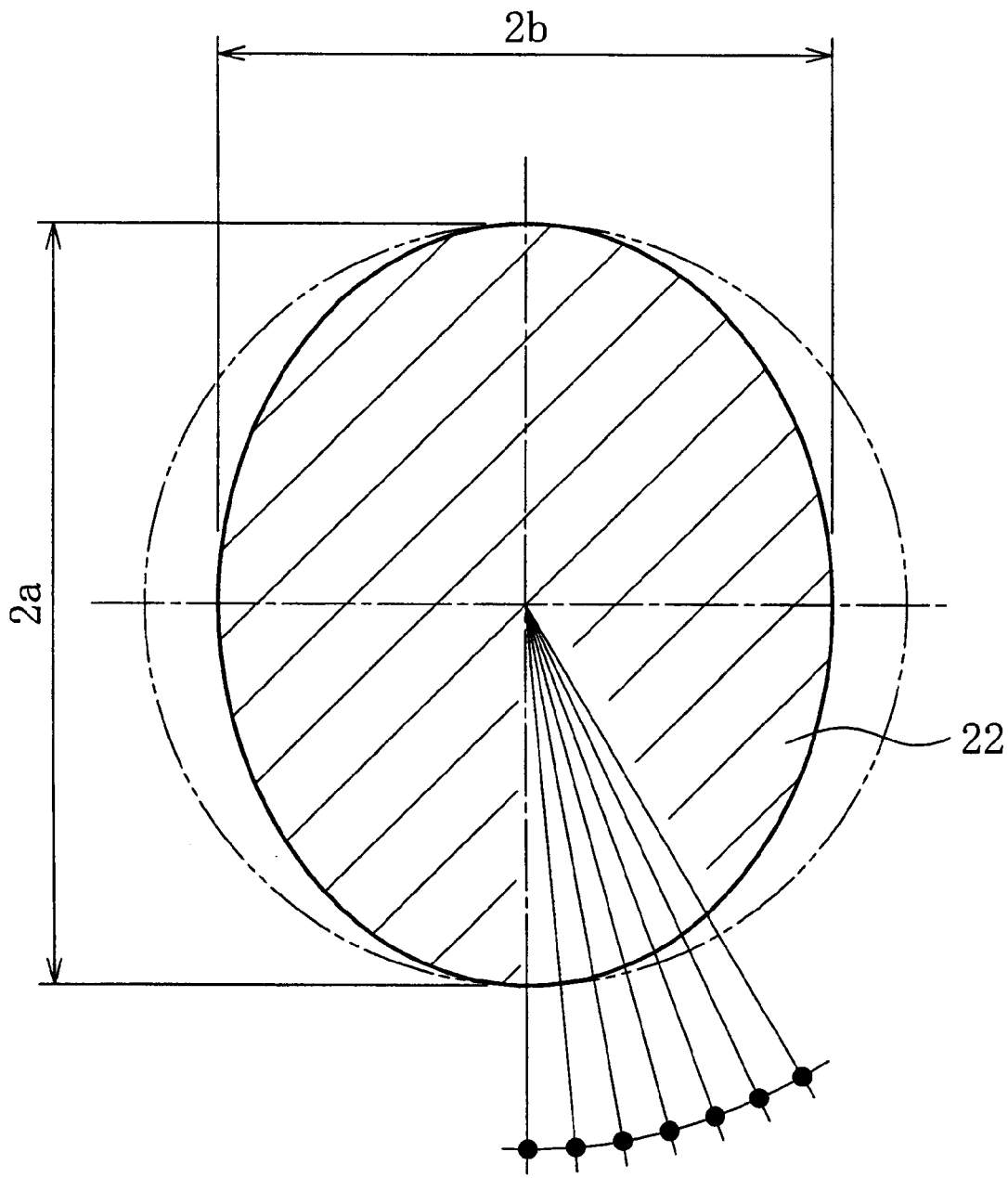
FIG. 12 is a cross sectional view of a leg shaft in the tripod member for explaining a further embodiment corresponding to a case where the constant velocity joint takes an operating angle.

Further, in an embodiment shown in FIG. 12, said contact region β is not defined by a single ellipse but by continuously changing the ellipticity b/a. For example, in the case where the service operating angle θ is 15° and the radius of curvature, R, of the inner peripheral surface of the ring 32 is 2.898a, as in the above case, in the contact region, the ellipticity at the position crossing the major axis is 1.0 and is gradually decreased as the distance from said position increases until it is 0.635 in the non-contact region. Alternatively, the shape may be such that the ellipticity is gradually decreased from 1.0 to 0.635, from major to minor axis side without regard to whether the region is the contact region or the non-contact region. FIG. 12 illustrates the case where the ellipticity is 1.0 at the position crossing the major axis of the contact region and as the distance from said position increases, the radius of curvature is gradually decreased at predetermined angular intervals, for example, as shown.

FIGS. 6 through 8, and 13 show constant velocity joints according to other embodiments. The constant velocity joint in FIG. 6 has a roller assembly 130 which comprises a ring 132 relatively rotatable through balls 136, and a roller 134 consisting of a set of annular roller portions 134a and 134b, the cylindrical inner peripheral surface of the ring 132 being fitted on the spherical outer peripheral surface of a leg shaft 122 of a tripod member 120. The radius of curvature of the outer peripheral surface of the leg shaft 122 differs from that of the inner peripheral surface of the ring 132 as seen in a section normal to the axis of the leg shaft 122, whereby a clearance is defined between the two to facilitate the flow of a lubricant agent between the sliding surfaces. As a result, the lubricating performance is improved to reduce the friction resistance, suppressing heat generation, wear, flaking, adhesion, etc., of the sliding surfaces, thus improving the durability of the constant velocity joint. In addition, annular grooves 132' are formed in the outer peripheral surface at the ends of the ring 132 to receive a stop ring 138 in each annular groove 132', thereby widthwise fixing the annular roller portions 134a and 134b. This enables unit handling of the roller assembly 130, facilitating the handling.

Figure 7:
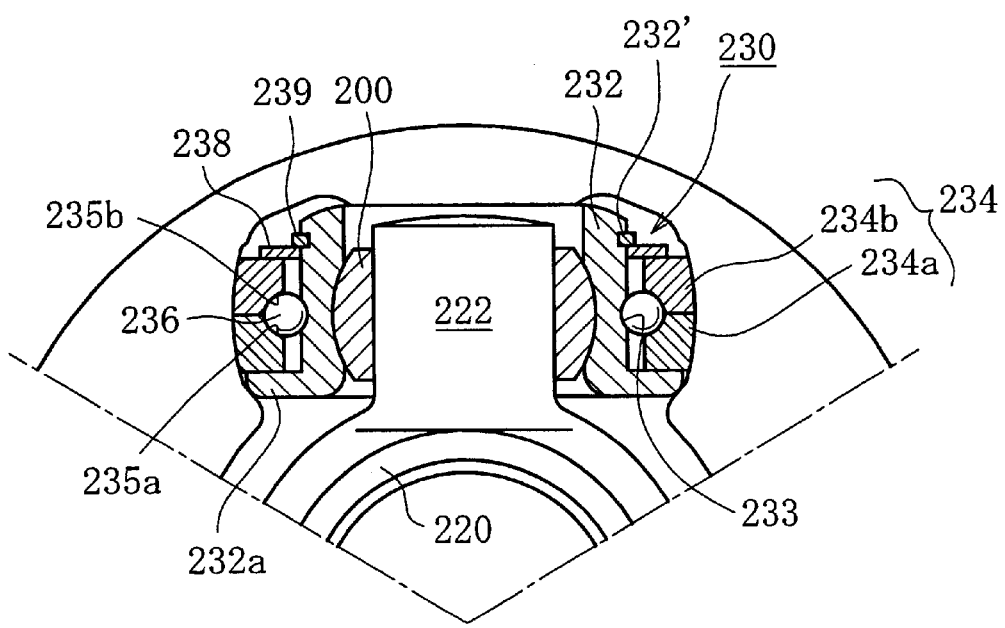
FIG. 7 is a principal sectional view of a constant velocity joint showing another embodiment.

The constant velocity joint in FIG. 7 has a roller assembly 230 which comprises a ring 232 relatively rotatable through balls 236, and a roller 234 consisting of a set of annular roller portions 234a and 234b. A bushing 200 whose outer peripheral surface is convexly spherical and whose inner peripheral surface is cylindrical is interposed between the concavely spherical inner peripheral surface of a ring 232 and the cylindrical outer peripheral surface of the leg shaft 222 of the tripod member 220. In addition, in this embodiment, the ring 232 has a flange 232a integrally formed on one end outer peripheral surface thereof and an annular groove 232' formed in the other end outer peripheral surface. A stop ring 238 is abutted against one end side (illustrated upper side) of the roller 234 while a stop member 239 is fitted in said annular groove 232', so that the flange 232a, the stop ring 238, and the stop member 239 cooperate with each other to hold the roller 234. This arrangement facilitates unitization of the roller assembly 230.

Figure 8:
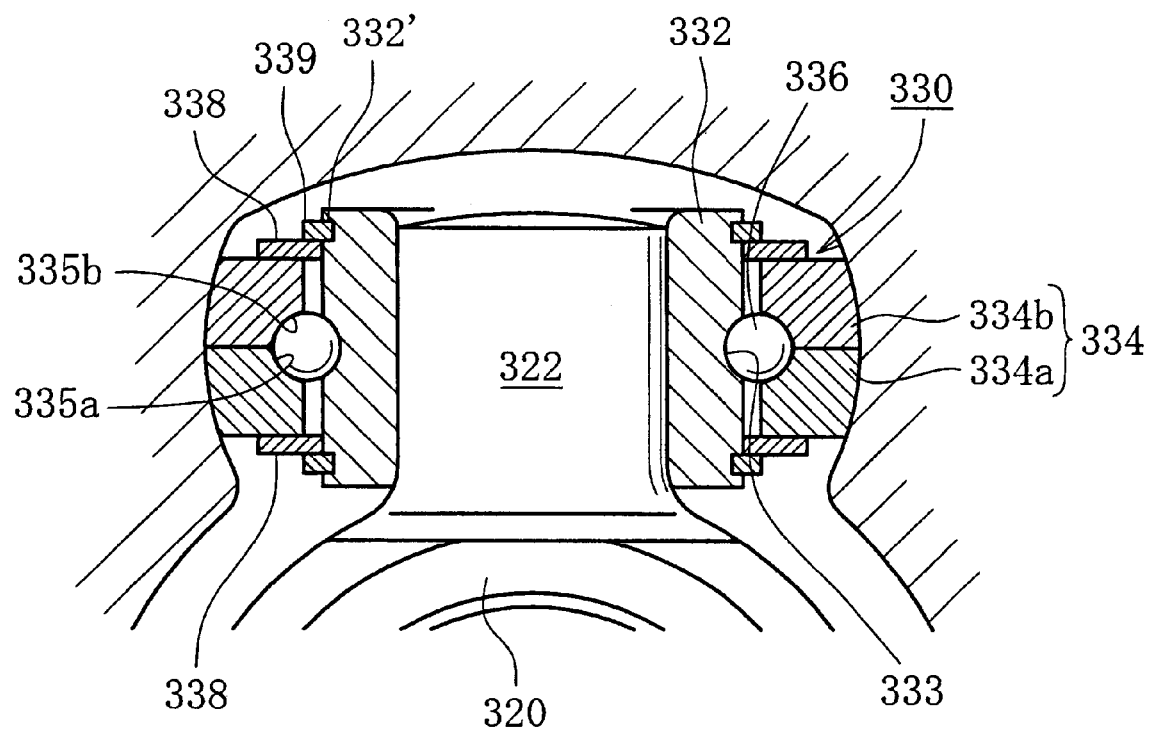
FIG. 8 is a principal sectional view of a constant velocity joint showing another embodiment.

The constant velocity joint in FIG. 8 has a roller assembly 330 which comprises a ring 332 relatively rotatable through balls 336, and a roller 334 consisting of a set of annular roller portions 334a and 334b, with a ring 332 slidably fitted on the cylindrical outer peripheral surface of a leg shaft 322 of a tripod member 320. In this embodiment, differing from the other embodiments, the roller assembly 330 is only movable axially of the leg shaft 322, so that the so-called oscillatory movement is not involved. In addition, in this embodiment, stop rings 338 are disposed on both ends of the roller 334 and held in position by stop members 339 fitted in annular grooves 332' formed in the outer peripheral surface at the ends of the ring 332.

Figure 13:
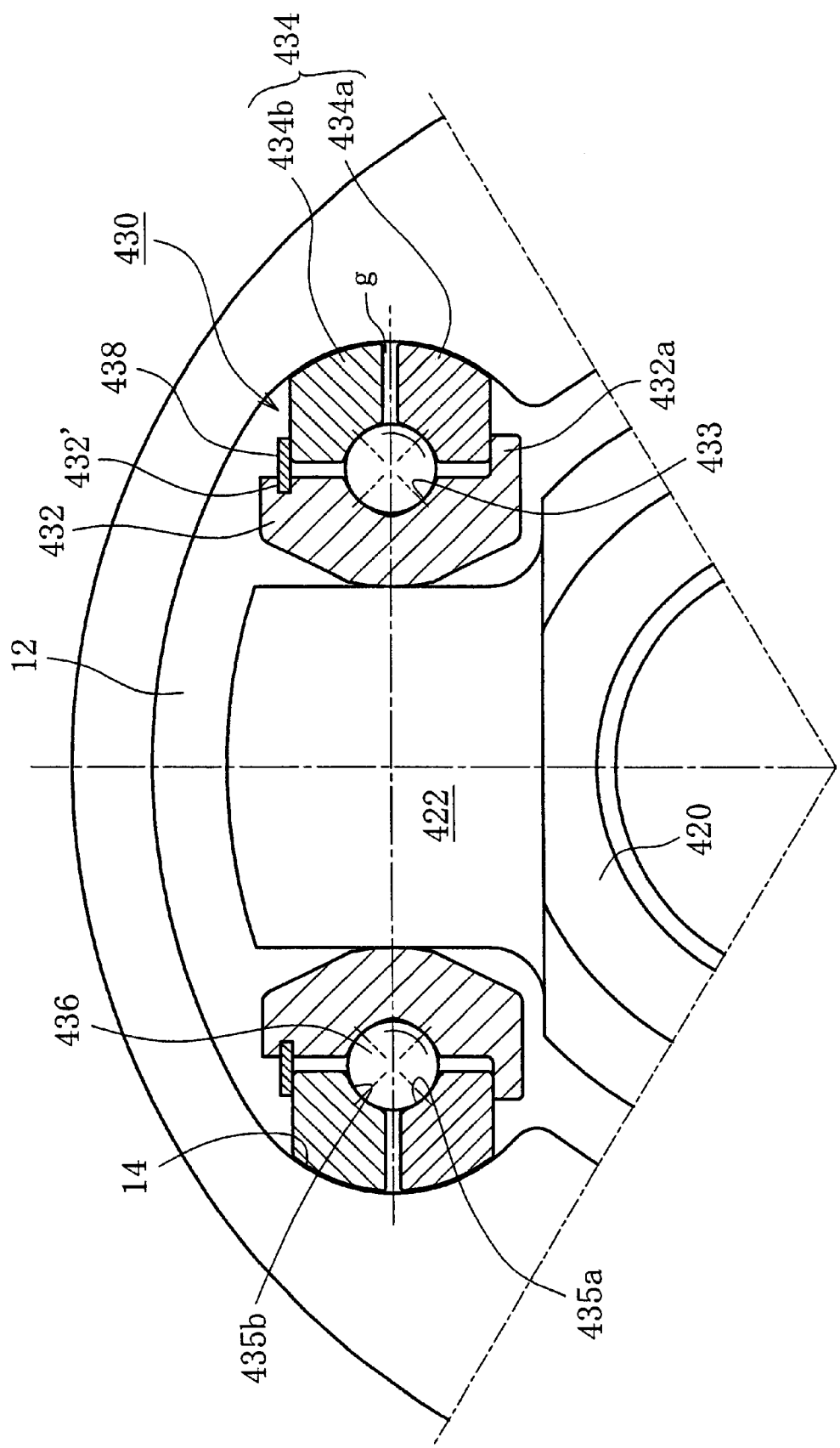
FIG. 13 is a principal sectional view of a constant velocity joint according to still another embodiment wherein an annular roller portion has a clearance in the direction of the axis of the leg shaft of the tripod member.
Figure 14A:
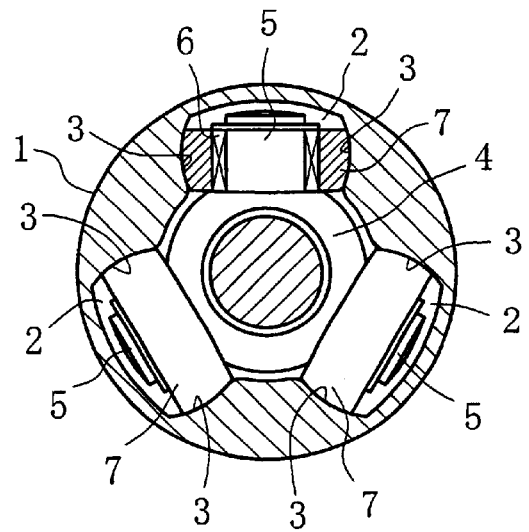
FIG. 14(A) is a cross sectional view of a conventional constant velocity joint; (B) is a longitudinal sectional view; and (C) is a schematic perspective view showing the mutual relationship between the roller and the roller guide surface.
Figure 14B:
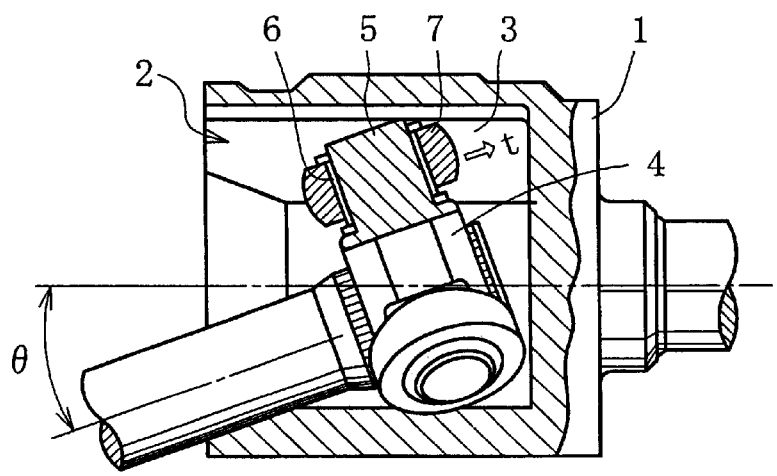
Figure 14C:
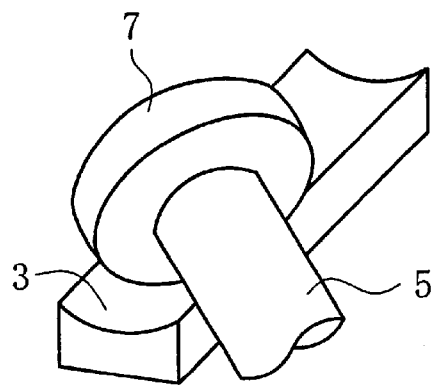

The constant velocity joint in FIG. 13 has a roller assembly 430 which comprises a ring 432 relatively rotatable through balls 436, and a roller 434 consisting of a set of annular roller portions 434a and 434b, with a ring 432 slidably fitted on the cylindrical outer peripheral surface of a leg shaft 422 of a tripod member 420. In this case, said set of annular roller portions 434a and 434b have a clearance g defined axially of the leg shaft 422 of the tripod member 420. The set of annular roller portions 434a and 434b thus having the clearance g defined axially of the leg shaft 422 results in the lubricant agent easily flowing through the clearance g. As a result, the lubricating performance is improved to reduce the friction resistance, suppressing heat generation, wear, flaking, adhesion, etc., thus improving the durability of the constant velocity joint. Furthermore, the set of annular roller portions 434a and 434b are capable of independent rotation and inclination, and particularly when the joint takes an operating angle, smooth operation is obtained. In addition, the arrangement in which such set of annular roller portions 434a and 434b have a clearance g defined axially of the leg shaft 422 may be employed in the embodiments of FIGS. 1 through 8 described above. Further, in this embodiment, the ring 432 has a flange 432a integrally formed on one end and an annular groove 432' formed in the other end outer peripheral surface thereof, with a stop ring 438 fitted in said annular groove 432' to cooperate with the flange 432a to hold the roller 434. Further, this embodiment shows the case where the roller guide surface 14 and roller 434 make angular contact with each other and where contact between the raceway surfaces 435a, 435b of the roller 434 (annular roller portions 434a, 434b) and the balls 436, and contact between the balls 436 and the raceway surface 433 of the ring 432 have a contact angle. Such angular contact between the roller guide surface 14 and the rollers 434 is as described above in FIG. 5 and the arrangement in which the roller 434 and the balls 436 have a contact angle and the balls 436 and the raceway surface 433 of the ring 432 have a contact angle is as described in FIG. 4.

The present invention provides a constant velocity joint comprising an outer joint member having three track grooves each having circumferentially opposed roller guide surfaces, a tripod member having three radially projecting leg shafts, a roller inserted in each said track groove, and a ring fitted on each said leg shaft to rotatably support said roller, said roller being movable along said roller guide surfaces axially of the outer joint member, wherein said roller consists of a set of annular roller portions, with balls interposed between outer raceway surface formed on the inner periphery of each annular roller portion and the inner peripheral raceway surface formed on the outer periphery of said ring. Therefore, the problems such as skew are eliminated and the roller is supported by balls which always rotate smoothly with low friction. When the roller rolls in the track groove in the outer joint member along the roller guide surfaces, low friction and low resistance rolling is realized. Therefore, the slide resistance produced during the sliding of the roller in the track groove axially of the outer joint member is further reduced and so is the induced thrust which is produced during transmission of torque with an operating angle formed between the outer joint member and the tripod member; thus, it is possible to provide a high-performance slide type tripod type constant velocity joint having less vibration and less noise.

The ring whose inner peripheral surface has a convexly arcuate section contacts the inner peripheral surface of said ring in a direction orthogonal to the axis of the joint and fits on the outer peripheral surface of the leg shaft having a sectional shape forming a clearance between itself and the inner peripheral surface of said ring axially of the joint. As a result, when the joint takes an operating angle, the leg shaft can incline with respect to the outer joint member without changing the attitude of the roller assembly. Furthermore, since the ellipse of contact between the outer peripheral surface of the leg shaft and the ring approaches a dot from an elongated form, the friction moment tending to incline the roller assembly is reduced. Therefore, the attitude of the roller assembly is stabilized all the time, and the roller is held parallel with the roller guide surfaces, so that the roller can roll smoothly. This contributes to reduction of the slide resistance and to reduction of induced thrust as well. Further, there is another advantage that the increased modulus of section of the root of the leg shaft increases the bending strength of the leg shaft.

The constant velocity joint of the present invention, if applied to drive shafts of automobiles, will contribute to the improvement of the automobile NVH associated with the size of the slide resistance and induced thrust, and increase the freedom of the design of the suspension.

What is claimed is:

1. A constant velocity joint comprising an outer joint member having three track grooves each having circumferentially opposed roller guide surfaces, a tripod member having three radially projecting leg shafts, a roller inserted in each said track groove, and a ring fitted on each said leg shaft to rotatably support said roller, said roller being movable along said roller guide surfaces axially of the outer joint member, said constant velocity joint being characterized in that said roller comprises a set of annular roller segments being separated by at least one split plane normal to the axis of said roller, thereby allowing relative rotation of said annular roller segments, the inner periphery of each said annular roller segment and the outer periphery of said ring being respectively formed with a raceway surface for a single row of balls to roll thereon, with balls interposed between the raceway surfaces.

2. A constant velocity joint as set forth in claim 1, characterized in that said set of annular roller segments abut against each other axially of said leg shaft.

3. A constant velocity joint as set forth in claim 1, characterized in that said set of annular roller segments has a clearance axially of said leg shaft.

4. A constant velocity joint as set forth in claim 1, characterized in that the inner peripheral surface of said ring has a convexly arcuate section, and the outer peripheral surface of said leg shaft has a sectional shape such that it contacts the inner peripheral surface of said ring in a direction orthogonal to the axis of the joint and forms a clearance between itself and the inner peripheral surface of said ring in the axial direction of the joint.

5. A constant velocity joint as set forth in claim 2, characterized in that the inner peripheral surface of said ring has a convexly arcuate section, and the outer peripheral surface of said leg shaft has a sectional shape such that it contacts the inner peripheral surface of said ring in a direction orthogonal to the axis of the joint and forms a clearance between itself and the inner peripheral surface of said ring in the axial direction of the joint.

6. A constant velocity joint as set forth in claim 3, characterized in that the inner peripheral surface of said ring has a convexly arcuate section, and the outer peripheral surface of said leg shaft has a sectional shape such that it contacts the inner peripheral surface of said ring in a direction orthogonal to the axis of the joint and forms a clearance between itself and the inner peripheral surface of said ring in the axial direction of the joint.

7. A constant velocity joint as set forth in claim 4, characterized in that the cross section of said leg shaft is elliptic with its major axis being orthogonal to the axis of the joint, wherein letting a be the major radius and b be the minor radius, b/a is 0.50–0.98.

8. A constant velocity joint as set forth in claim 5, characterized in that the cross section of said leg shaft is elliptic with its major axis being orthogonal to the axis of the joint, wherein letting a be the major radius and b be the minor radius, b/a is 0.50–0.98.

9. A constant velocity joint as set forth in claim 6, characterized in that the cross section of said leg shaft is elliptic with its major axis being orthogonal to the axis of the joint, wherein letting a be the major radius and b be the minor radius, b/a is 0.50–0.98.

10. A constant velocity joint as set forth in claim 1, characterized in that the inner peripheral surface of said ring is cylindrical and the outer peripheral surface of said leg shaft is spherical.

11. A constant velocity joint as set forth in claim 2, characterized in that the inner peripheral surface of said ring is cylindrical and the outer peripheral surface of said leg shaft is spherical.

12. A constant velocity joint as set forth in claim 3, characterized in that the inner peripheral surface of said ring is cylindrical and the outer peripheral surface of said leg shaft is spherical.

13. A constant velocity joint as set forth in claim 1, characterized in that a sleeve whose outer peripheral surface is convexly spherical and whose inner peripheral surface is cylindrical is interposed between the concavely spherical inner peripheral surface of said ring and the cylindrical outer peripheral surface of said leg shaft.

14. A constant velocity joint as set forth in claim 2, characterized in that a sleeve whose outer peripheral surface is convexly spherical and whose inner peripheral surface is cylindrical is interposed between the concavely spherical inner peripheral surface of said ring and the cylindrical outer peripheral surface of said leg shaft.

15. A constant velocity joint as set forth in claim 3, characterized in that a sleeve whose outer peripheral surface is convexly spherical and whose inner peripheral surface is cylindrical is interposed between the concavely spherical inner peripheral surface of said ring and the cylindrical outer peripheral surface of said leg shaft.

16. A constant velocity joint as set forth in any of claims 1 through 15, characterized in that the longitudinal section of the outer peripheral surface of said roller is convexly arcuate, and the cross section of said roller guide surfaces is concavely arcuate.

17. A constant velocity joint as set forth in any of claims 1 through 15, characterized in that said balls and said raceway surface contact each other with a contact angle.

18. A constant velocity joint as set forth in any of claims 1 through 15, characterized in that said roller and said roller guide surfaces make angular contact with each other.

* * * * *